US009900856B2

(12) United States Patent
Wu et al.

(10) Patent No.: US 9,900,856 B2
(45) Date of Patent: Feb. 20, 2018

(54) METHOD AND APPARATUS FOR TIME OR FREQUENCY SYNCHRONIZATION IN NON-GEOSYNCHRONOUS SATELLITE COMMUNICATION SYSTEMS

(71) Applicant: QUALCOMM Incorporated, San Diego, CA (US)

(72) Inventors: Qiang Wu, San Diego, CA (US); Peter John Black, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 14/862,822

(22) Filed: Sep. 23, 2015

(65) Prior Publication Data
US 2016/0278033 A1 Sep. 22, 2016

Related U.S. Application Data

(60) Provisional application No. 62/136,137, filed on Mar. 20, 2015.

(51) Int. Cl.
*H04W 76/00* (2009.01)
*H04W 56/00* (2009.01)
(Continued)

(52) U.S. Cl.
CPC .......... *H04W 56/0015* (2013.01); *H04B 7/01* (2013.01); *H04B 7/18502* (2013.01);
(Continued)

(58) Field of Classification Search
CPC .......... H04L 2027/0022; H04L 25/022; H04L 27/2665; H04L 5/0048; H04L 7/0029;
(Continued)

(56) References Cited

U.S. PATENT DOCUMENTS 5,943,606 A 8/1999 Kremm et al.
6,058,306 A 5/2000 Liu
(Continued)

FOREIGN PATENT DOCUMENTS

WO 9815070 A1 4/1998
WO 9815071 A1 4/1998
(Continued)

OTHER PUBLICATIONS

International Search Report and Written Opinion—PCT/US2016/022180—ISA/EPO—dated Jun. 10, 2016.
(Continued)

*Primary Examiner* — Sai Aung
(74) *Attorney, Agent, or Firm* — Muncy, Geissler, Olds & Lowe, PC

(57) ABSTRACT

Method and apparatus for time or frequency synchronization of radio signals transmitted by user terminals in communication with a gateway through a satellite is provided. The satellite may be part of a non-synchronous satellite communication system, such as a low-earth orbit (LEO) satellite communication system for data, voice or video communications. Times of transmission of return link radio signals from the user terminals may be adjusted such that the signals arrive at the satellite or at the gateway without large time delay differentials. Carrier frequencies of return link radio signals transmitted from the user terminals may be adjusted such that the signals arrive at the satellite or at the gateway without large frequency offset differentials.

29 Claims, 11 Drawing Sheets

(51) Int. Cl.
*H04B 7/185* (2006.01)
*H04B 7/01* (2006.01)

(52) U.S. Cl.
CPC .... *H04B 7/18513* (2013.01); *H04W 56/0035* (2013.01); *H04W 56/0045* (2013.01)

(58) Field of Classification Search
CPC . H04L 7/02; H04L 1/0026; H04L 1/04; H04L 2027/0026; H04W 4/025; H04W 64/00; H04W 4/02; H04W 4/22; G01S 19/42; G01S 5/021; G01S 13/765; G01S 19/252; G01S 19/258; G01S 5/0045; G01S 13/583; G01S 13/825
See application file for complete search history.

(56) References Cited

U.S. PATENT DOCUMENTS

| | | | |
|---|---|---|---|
| 6,418,147 B1 | 7/2002 | Wiedeman | |
| 6,823,170 B1 | 11/2004 | Dent | |
| 7,826,493 B2* | 11/2010 | Chang | H04B 1/70735 370/503 |
| 7,933,215 B2 | 4/2011 | Schiff et al. | |
| 8,139,685 B2* | 3/2012 | Simic | H04B 1/26 375/316 |
| 8,384,584 B2* | 2/2013 | Karr | G01S 13/325 342/44 |
| 2009/0225743 A1* | 9/2009 | Nicholls | H04J 3/0688 370/350 |
| 2011/0116386 A1* | 5/2011 | Blanchard | H04B 7/155 370/242 |
| 2011/0140788 A1* | 6/2011 | Scott | G04G 3/00 331/16 |
| 2014/0226640 A1* | 8/2014 | Zhu | H04W 56/0045 370/336 |

FOREIGN PATENT DOCUMENTS

| | | |
|---|---|---|
| WO | 0014566 A1 | 3/2000 |
| WO | 2004002022 A1 | 12/2003 |

OTHER PUBLICATIONS

International Search Report and Written Opinion—PCT/US2016/022180—ISA/EPO—dated Mar. 29, 2017.

* cited by examiner

METHOD AND APPARATUS FOR TIME OR FREQUENCY SYNCHRONIZATION IN NON-GEOSYNCHRONOUS SATELLITE COMMUNICATION SYSTEMS

CROSS-REFERENCE TO RELATED APPLICATIONS

The present Application for Patent claims the benefit of U.S. Provisional Application No. 62/136,137, entitled "METHOD AND APPARATUS FOR TIME OR FREQUENCY SYNCHRONIZATION IN NON-GEOSYNCHRONOUS SATELLITE COMMUNICATION SYSTEMS," filed Mar. 20, 2015, assigned to the assignee hereof, and expressly incorporated herein by reference in its entirety.

INTRODUCTION

Various aspects described herein relate to satellite communications, and more particularly, to time or frequency synchronization in non-geosynchronous satellite communication systems.

Conventional satellite-based communication systems include gateways and one or more satellites to relay communication signals between the gateways and one or more user terminals. A gateway is an Earth station having an antenna for transmitting signals to, and receiving signals from, communication satellites. A gateway provides communication links, using satellites, for connecting a user terminal to other user terminals or users of other communication systems, such as a public switched telephone network, Internet and various public and/or private networks. A satellite is an orbiting receiver and repeater used to relay information.

A satellite can receive signals from and transmit signals to a user terminal provided the user terminal is within the "footprint" of the satellite. The footprint of a satellite is the geographic region on the surface of the Earth within the range of signals of the satellite. The footprint is usually geographically divided into "beams," through the use of beam-forming antennas. Each beam covers a particular geographic region within the footprint. Beams may be directed so that more than one beam from the same satellite covers the same geographic region.

Geosynchronous satellites have long been used for communications. A geosynchronous satellite is stationary relative to a given location on the Earth, and thus there is little timing shift and Doppler frequency shift in radio signal propagation between a communication transceiver on the Earth and the geosynchronous satellite. However, because geosynchronous satellites are limited to a geosynchronous orbit (GSO), which is a circle having a radius of approximately 42,164 km from the center of the Earth directly above the Earth's equator, the number of satellites that may be placed in the GSO is limited. As alternatives to geosynchronous satellites, communication systems which utilize a constellation of satellites in non-geosynchronous orbits, such as low-earth orbits (LEO), have been devised to provide communication coverage to the entire Earth or at least large parts of the Earth.

Compared to GSO satellite-based and terrestrial communication systems, non-geosynchronous satellite-based systems, such as LEO satellite-based systems, may present several challenges for time or frequency synchronization due to different velocities of a satellite relative to a communication device (such as a gateway or a user terminal (UT)) on the ground at different times as well as different carrier frequencies for different beams. For example, a feeder link between a gateway on the ground and a LEO satellite may experience a variation in the Doppler frequency shift that varies with time and carrier frequency. The feeder link may also experience a variation in the propagation delay of radio frequency (RF) signals between the satellite and the gateway that varies with time. As another example, service links between the satellite and various UTs may experience differentials in Doppler frequency shifts among the different UTs within the coverage of a satellite beam. Moreover, such service links may also experience differentials in signal propagation delays among the UTs within the coverage of a satellite beam. It is generally desirable to eliminate or at least to reduce differential Doppler frequency shifts and differential time delays between different UTs within a beam coverage of a non-geosynchronous satellite.

SUMMARY

Aspects of the disclosure are directed to apparatus and methods for time or frequency synchronization in non-geosynchronous satellite communication systems.

In one aspect, a method of controlling a time of transmission and radio frequency of a first signal at a first ground station in communication with a satellite is provided, the method comprising: computing a pre-correction time value based on a local time reference and a received signal or ephemeris of the satellite; applying the pre-correction time value to adjust the time of transmission of the first signal at the first ground station; computing a pre-correction frequency value based on a local frequency reference and the received signal or ephemeris of the satellite; and applying the pre-correction frequency value to adjust the radio frequency of the first signal at the first ground station.

In another aspect, an apparatus configured to control a time of transmission and radio frequency of a first signal at a first ground station in communication with a satellite is provided, the apparatus comprising: logic configured to compute a pre-correction time value based on a local time reference and a received signal or ephemeris of the satellite; logic configured to apply the pre-correction time value to adjust the time of transmission of the first signal at the first ground station; logic configured to compute a pre-correction frequency value based on a local frequency reference and the received signal or ephemeris of the satellite; and logic configured to apply the pre-correction frequency value to adjust the radio frequency of the first signal at the first ground station.

In another aspect, an apparatus for controlling a time of transmission and radio frequency of a first signal at a first ground station in communication with a satellite is provided, the apparatus comprising: means for computing a pre-correction time value based on a local time reference and a received signal or ephemeris of the satellite; means for applying the pre-correction time value to adjust the time of transmission of the first signal at the first ground station; means for computing a pre-correction frequency value based on a local frequency reference and the received signal or ephemeris of the satellite; and means for applying the pre-correction frequency value to adjust the radio frequency of the first signal at the first ground station.

In yet another aspect, a non-transitory computer-readable medium comprising instructions to cause a computer or processor to control a time of transmission and radio frequency of a first signal at a first ground station in communication with a satellite is provided, the instructions comprising instructions to: compute a pre-correction time value based on a local time reference and a received signal or ephemeris of the satellite; apply the pre-correction time value to adjust the time of transmission of the first signal at the first ground station; compute a pre-correction frequency value based on a local frequency reference and the received signal or ephemeris of the satellite; and apply the pre-correction frequency value to adjust the radio frequency of the first signal at the first ground station

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
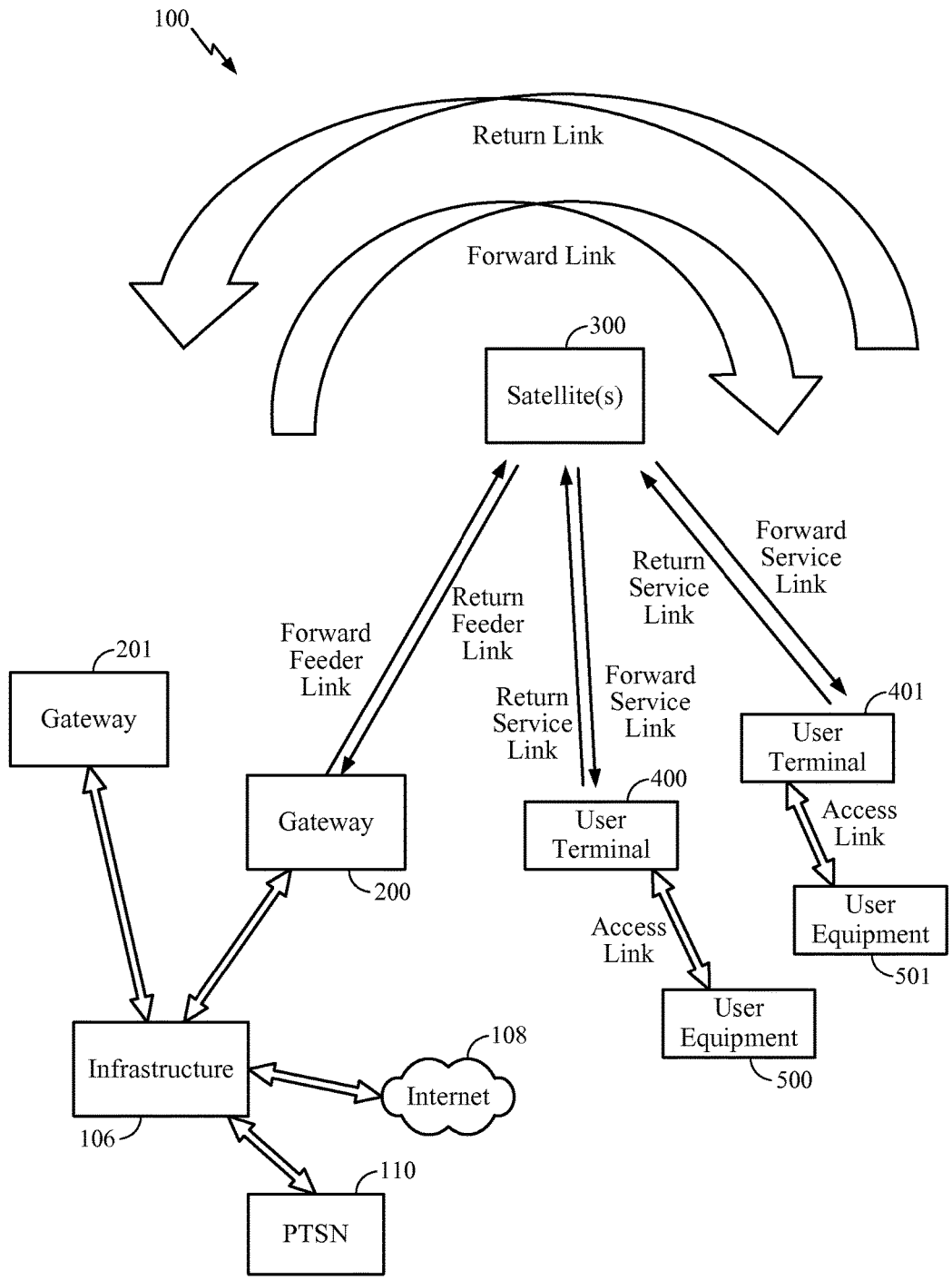
FIG. 1 is a block diagram of an example communication system.

Various aspects of the disclosure relate to methods and apparatus for time or frequency synchronization of radio signals transmitted by user terminals (UTs) in communication with a gateway through a satellite in a non-synchronous satellite communication system, such as a low-earth orbit (LEO) satellite communication system for data, voice or video communications. In one aspect, times of transmission of radio signals from the user terminals may be adjusted such that the signals arrive at the gateway at the same time or with time-of-arrival differentials within a specified tolerance. In another aspect, carrier frequencies of radio signals transmitted from the user terminals may be adjusted such that frequency offset differentials, including but not limited to Doppler offset differentials, at the gateway are eliminated or at least reduced to within a specified tolerance. In one aspect, an open loop pre-correction is provided to generate pre-correction values for the time or frequency, which may be applied to adjust the transmission times to equalize propagation delays or to adjust the carrier frequencies to eliminate or to reduce frequency offset differentials. In another aspect, a closed loop pre-correction is provided in addition to the open loop pre-correction to provide more accurate correction values for the time or frequency. Various other aspects of the disclosure will also be described below in further detail.

Specific examples of the disclosure are described in the following description and related drawings. Alternate examples may be devised without departing from the scope of the disclosure. Additionally, well-known elements will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein is for the purpose of describing particular aspects only and is not intended to be limiting of the aspects. As used herein, the singular forms "a," "an," and "the" are intended to include the plural forms as well, unless the context clearly indicates otherwise. It will be further understood that the terms "comprises," "comprising," "includes," or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "I" between two adjacent words has the same meaning as "or" unless expressly stated otherwise. Moreover, phrases such as "connected to," "coupled to," or "in communication with" are not limited to direct connections unless expressly stated otherwise.

Further, many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application-specific integrated circuits (ASICs), field programmable gate arrays (FPGAs), or various other types of general purpose or special purpose processors or circuits, by program instructions being executed by one or more processors, or by a combination of both. Additionally, the sequence of actions described herein can be considered to be embodied entirely within any form of computer-readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

FIG. 1 illustrates an example of a satellite communication system 100 which includes a plurality of satellites (although only one satellite 300 is shown for clarity of illustration) in non-geosynchronous orbits, for example, low-earth orbits (LEO), a gateway 200 in communication with the satellite 300, a plurality of user terminals (UTs) 400 and 401 in communication with the satellite 300, and a plurality of user equipment (UE) 500 and 501 in communication with the UTs 400 and 401, respectively. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or UE 501 may be a device (e.g., access point, small cell, etc.) that is used to communicate with one or more end user devices. In the example illustrated in FIG. 1, the UT 400 and the UE 500 communicate with each other via a bidirectional access link (having a forward access link and return access link), and similarly, the UT 401 and the UE 501 communicate with each other via another bidirectional access link. In another implementation, one or more additional UEs (not shown) may be configured to receive only and therefore communicate with a UT only using a forward access link. In another implementation, one or more additional UEs (not shown) may also communicate with the UT 400 or UT 401. Alternatively, a UT and a corresponding UE may be integral parts of a single physical device, such as a mobile telephone with an integral satellite transceiver and an antenna for communicating directly with a satellite, for example.

The gateway 200 may have access to Internet 108 or one or more other types of public, semiprivate, or private networks. In the example illustrated in FIG. 1, the gateway 200 is in communication with infrastructure 106, which is capable of accessing the Internet 108 or one or more other types of public, semiprivate or private networks. The gateway 200 may also be coupled to various types of communication backhaul, including, for example, landline networks such as optical fiber networks or public switched telephone networks (PSTN) 110. Further, in alternative implementations the gateway 200 may interface to the Internet 108, the PSTN 110, or one or more other types of public, semiprivate, or private networks without using the infrastructure 106. Furthermore, the gateway 200 may communicate with other gateways, such as gateway 201 through the infrastructure 106 or alternatively may be configured to communicate to the gateway 201 without using the infrastructure 106. The infrastructure 106 may include, in whole or part, a network control center (NCC), a satellite control center (SCC), a wired and/or wireless core network, and/or any other components or systems used to facilitate operation of and/or communication with the satellite communication system 100.

Communications between the satellite 300 and the gateway 200 in both directions are called feeder links, whereas communications between the satellite 300 and each of the UTs 400 and 401 in both directions are called service links. A signal path from the satellite 300 to a ground station, which may be the gateway 200 or one of the UTs 400 and 401, may be generically called a downlink. A signal path from a ground station to the satellite 300 may be generically called an uplink. Additionally, as illustrated, signals can have a general directionality such as a forward link and a return link or reverse link. Accordingly, a communication link in a direction originating from the gateway 200 and terminating at the UT 400 through the satellite 300 is called a forward link, whereas a communication link in a direction originating from the UT 400 and terminating at the gateway 200 through the satellite 300 is called a return link or reverse link. As such, the signal path from the gateway 200 to the satellite 300 is labeled "Forward Feeder Link" whereas the signal path from the satellite 300 to the gateway 200 is labeled "Return Feeder Link" in FIG. 1. In a similar manner, the signal path from each UT 400 or 401 to the satellite 300 is labeled "Return Service Link" whereas the signal path from the satellite 300 to each UT 400 or 401 is labeled "Forward Service Link" in FIG. 1.

Figure 2:
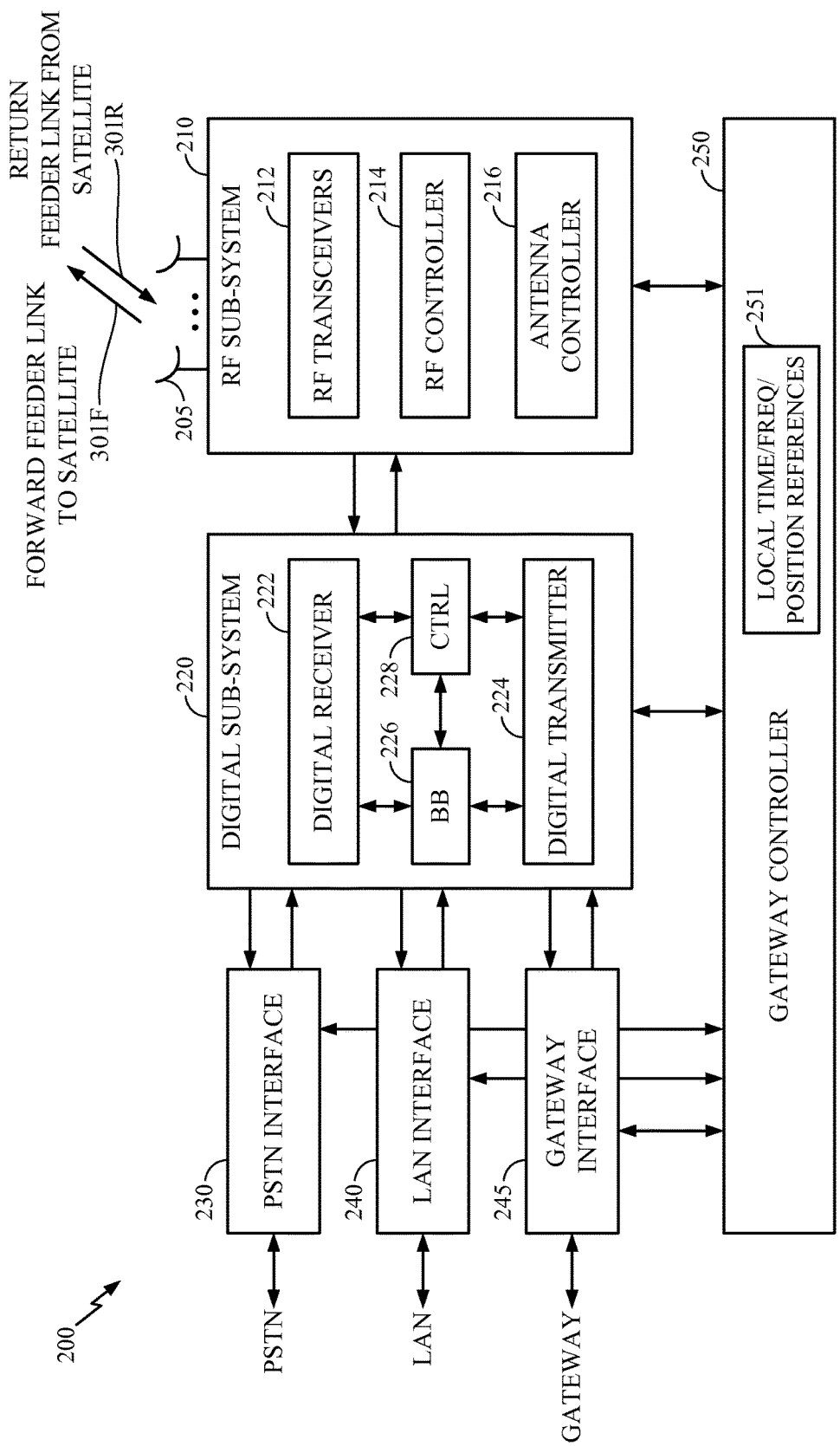
FIG. 2 is a block diagram of one example of the gateway of FIG. 1.

FIG. 2 is an example block diagram of the gateway 200, which also can apply to the gateway 201 of FIG. 1. The gateway 200 is shown to include a number of antennas 205, an RF subsystem 210, a digital subsystem 220, a Public Switched Telephone Network (PSTN) interface 230, a Local Area Network (LAN) interface 240, a gateway interface 245, and a gateway controller 250. The RF subsystem 210 is coupled to the antennas 205 and to the digital subsystem 220. The digital subsystem 220 is coupled to the PSTN interface 230, to the LAN interface 240, and to the gateway interface 245. The gateway controller 250 is coupled to the RF subsystem 210, the digital subsystem 220, the PSTN interface 230, the LAN interface 240, and the gateway interface 245.

The RF subsystem 210, which may include a number of RF transceivers 212, an RF controller 214, and an antenna controller 216, may transmit communication signals to the satellite 300 via a forward feeder link 301F, and may receive communication signals from the satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by digital subsystem 220). Each transmit chain may include an up-converter (e.g., a mixer) and a power amplifier (PA) to up-convert and amplify, respectively, communication signals to be transmitted to the satellite 300 in a well-known manner. In addition, each transmit chain may include a digital-to-analog converter (DAC) to convert the digital signals received from the digital subsystem 220 to analog signals to be transmitted to the satellite 300.

The RF controller 214 may be used to control various aspects of the number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. The digital subsystem 220 may process communication signals received from the RF subsystem 210 and forward the processed communication signals to the PSTN interface 230 and/or the LAN interface 240, and may process communication signals received from the PSTN interface 230 and/or the LAN interface 240 and forward the processed communication signals to the RF subsystem 210.

Each digital receiver module 222 may correspond to signal processing elements used to manage communications between the gateway 200 and the UT 400. One of the receive chains of the RF transceivers 212 may provide input signals to the digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to the UT 400 via the satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor (CTRL) 228, which is coupled to the digital receiver modules 222, the digital transmitter modules 224, and the baseband processor (BB) 226, may provide command and control signals to effect functions such as, but not limited to, signal processing, timing signal generation, power control, handoff control, diversity combining, and system interfacing.

The control processor (CTRL) 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

The baseband processor (BB) 226 is well known in the art and is therefore not described in detail herein. For example, the baseband processor (BB) 226 may include a variety of known elements such as (but not limited to) coders, data modems, and digital data switching and storage components.

The PSTN interface 230 may provide communication signals to, and receive communication signals from, an external PSTN either directly or through the infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects the gateway 200 to a ground-based network (e.g., the Internet).

The LAN interface 240 may provide communication signals to, and receive communication signals from, an external LAN. For example, the LAN interface 240 may be coupled to the Internet 108 either directly or through the infrastructure 106, as illustrated in FIG. 1. The LAN interface 240 is well known in the art, and therefore is not described in detail herein.

The gateway interface 245 may provide communication signals to, and receive communication signals from, one or more other gateways associated with the satellite communication system 100 of FIG. 1 (and/or to/from gateways associated with other satellite communication systems, not shown for simplicity). For some implementations, the gateway interface 245 may communicate with other gateways via one or more dedicated communication lines or channels (not shown for simplicity). For other implementations, the gateway interface 245 may communicate with other gateways using the PSTN interface 230 and/or other networks such as the Internet 108 (see also FIG. 1). For at least one implementation, the gateway interface 245 may communicate with other gateways via the infrastructure 106.

Overall gateway control may be provided by the gateway controller 250. The gateway controller 250 may plan and control utilization of the satellite 300's resources by the gateway 200. For example, the gateway controller 250 may analyze trends, generate traffic plans, allocate satellite resources, monitor (or track) satellite positions, and monitor the performance of the gateway 200 and/or the satellite 300. The gateway controller 250 may also be coupled to a ground-based satellite controller (not shown for simplicity) that maintains and monitors orbits of the satellite 300, relays satellite usage information to the gateway 200, tracks the positions of the satellite 300, and/or adjusts various channel settings of the satellite 300.

For the example implementation illustrated in FIG. 2, the gateway controller 250 includes a local time, frequency, and position references 251, which may provide local time or frequency information to the RF subsystem 210, the digital subsystem 220, and/or the interfaces 230, 240, and 245. The time or frequency information may be used to synchronize the various components of the gateway 200 with each other and/or with the satellite 300. The local time, frequency, and position references 251 may also provide position information (e.g., ephemeris data) of the satellite 300 to the various components of the gateway 200. Further, although depicted in FIG. 2 as included within the gateway controller 250, for other implementations, the local time, frequency, and position references 251 may be a separate subsystem that is coupled to the gateway controller 250 (and/or to one or more of the digital subsystem 220 and the RF subsystem 210).

Although not shown in FIG. 2 for simplicity, the gateway controller 250 may also be coupled to a network control center (NCC) and/or a satellite control center (SCC). For example, the gateway controller 250 may allow the SCC to communicate directly with the satellite 300, for example, to retrieve ephemeris data from the satellite 300. The gateway controller 250 may also receive processed information (e.g., from the SCC and/or the NCC) that allows the gateway controller 250 to properly aim the antennas 205 (e.g., at the satellite 300), to schedule beam transmissions, to coordinate handovers, and to perform various other well-known functions.

Figure 3:
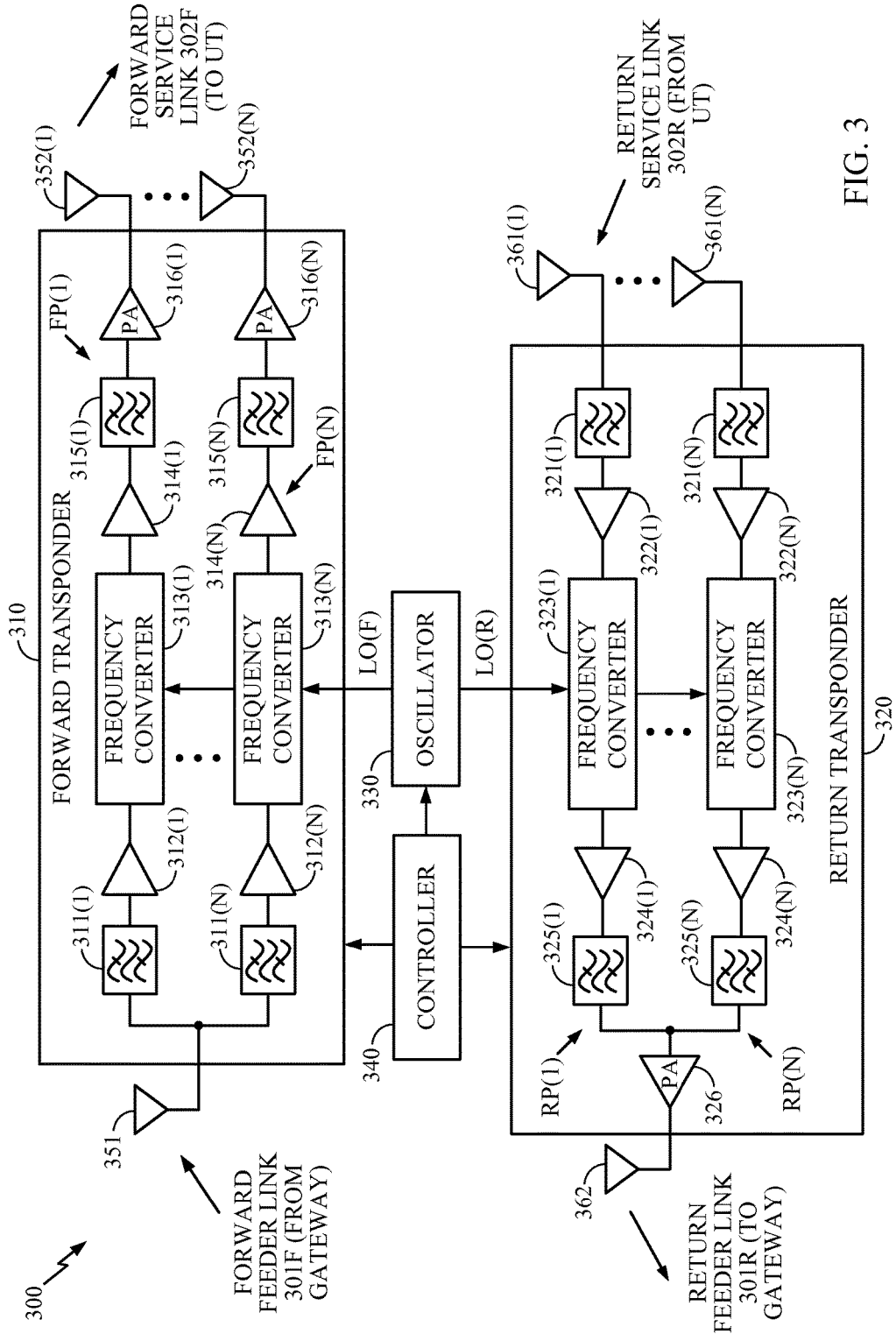
FIG. 3 is a block diagram of one example of the satellite of FIG. 1.

FIG. 3 is an example block diagram of the satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the gateway 200 and the UT 400. It will be appreciated that disclosure is not limited to any specific satellite configuration and any satellite or combinations of satellites that can provide the functional connection between the gateway 200 and the UT 400 can be considered within the scope of the disclosure. In one example, the satellite 300 is shown to include a forward transponder 310, a return transponder 320, an oscillator 330, a controller 340, forward link antennas 352(1)-352(N), and return link antennas 361(1)-361(N). The forward transponder 310, which may process communication signals within a corresponding channel or frequency band, may include a respective one of first bandpass filters 311(1)-311(N), a respective one of first LNAs 312(1)-312(N), a respective one of frequency converters 313(1)-313(N), a respective one of second LNAs 314(1)-314(N), a respective one of second bandpass filters 315(1)-315(N), and a respective one of PAs 316(1)-316(N).

Each of the PAs 316(1)-316(N) is coupled to a respective one of antennas 352(1)-352(N), as shown in FIG. 3.

Within each of the respective forward paths FP(1)-FP(N), the first bandpass filters 311(1)-311(N) pass signal components having frequencies within the channel or frequency band of the respective forward paths FP(1)-FP(N), and filter signal components having frequencies outside the channel or frequency band of the respective forward paths FP(1)-FP(N). Thus, the pass bands of the first bandpass filters 311(1)-311(N) correspond to the width of the channel associated with the respective forward paths FP(1)-FP(N). The first LNAs 312(1)-312(N) amplify the received communication signals to a level suitable for processing by the frequency converters 313(1)-313(N). The frequency converters 313(1)-313(N) convert the frequency of the communication signals in the respective forward paths FP(1)-FP(N) (e.g., to a frequency suitable for transmission from the satellite 300 to the UT 400). The second LNAs 314(1)-314(N) amplify the frequency-converted communication signals, and the second bandpass filters 315(1)-315(N) filter signal components having frequencies outside of the associated channel width. The PAs 316(1)-316(N) amplify the filtered signals to a power level suitable for transmission to the UT 400 via respective antennas 352(1)-352(N). The return transponder 320, which includes a number N of return paths RP(1)-RP(N), receives communication signals from the UT 400 along return service link 302R via the antennas 361(1)-361(N), and transmits communication signals to the gateway 200 along return feeder link 301R via one or more antennas 362. Each of the return paths RP(1)-RP(N), which may process communication signals within a corresponding channel or frequency band, may be coupled to a respective one of the antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filters 321(1)-321(N) pass signal components having frequencies within the channel or frequency band of the respective return paths RP(1)-RP(N), and filter signal components having frequencies outside the channel or frequency band of the respective return paths RP(1)-RP(N). Thus, the pass bands of the first bandpass filters 321(1)-321(N) may for some implementations correspond to the width of the channel associated with the respective return paths RP(1)-RP(N). The first LNAs 322(1)-322(N) amplify all the received communication signals to a level suitable for processing by the frequency converters 323(1)-323(N). The frequency converters 323(1)-323(N) convert the frequency of the communication signals in the respective return paths RP(1)-RP(N) (e.g., to a frequency suitable for transmission from the satellite 300 to the gateway 200). The second LNAs 324(1)-324(N) amplify the frequency-converted communication signals, and the second bandpass filters 325(1)-325(N) filter signal components having frequencies outside of the associated channel width. Signals from the return paths RP(1)-RP(N) are combined and provided to the one or more antennas 362 via a PA 326. The PA 326 amplifies the combined signals for transmission to the gateway 200.

The oscillator 330, which may be any suitable circuit or device that generates an oscillating signal, provides a forward local oscillator LO(F) signal to the frequency converters 313(1)-313(N) of the forward transponder 310, and provides a return local oscillator LO(R) signal to the frequency converters 323(1)-323(N) of the return transponder 320. For example, the LO(F) signal may be used by the frequency converters 313(1)-313(N) to convert communication signals from a frequency band associated with the transmission of signals from the gateway 200 to the satellite 300 to a frequency band associated with the transmission of signals from the satellite 300 to the UT 400. The LO(R) signal may be used by the frequency converters 323(1)-323(N) to convert communication signals from a frequency band associated with the transmission of signals from the UT 400 to the satellite 300 to a frequency band associated with the transmission of signals from the satellite 300 to the gateway 200.

The controller 340, which is coupled to the forward transponder 310, the return transponder 320, and the oscillator 330, may control various operations of the satellite 300 including (but not limited to) channel allocations. In one aspect, the controller 340 may include a memory coupled to a processor (not shown for simplicity). The memory may include a non-transitory computer-readable medium (e.g., one or more nonvolatile memory elements, such as EPROM, EEPROM, Flash memory, a hard drive, etc.) storing instructions that, when executed by the processor, cause the satellite 300 to perform operations including (but not limited to) those described herein.

Figure 4:
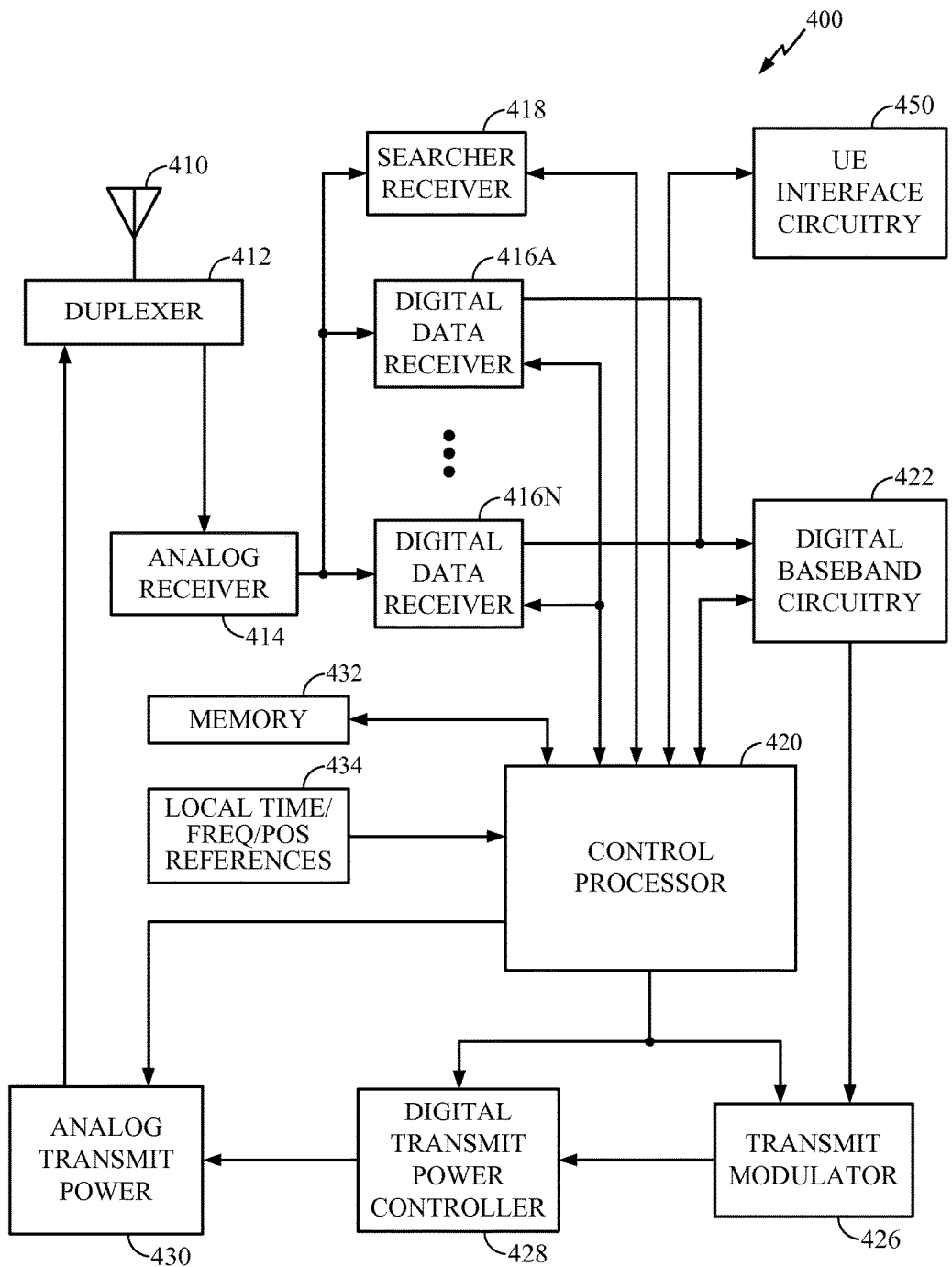
FIG. 4 is a block diagram of one example of the user terminal of FIG. 1.

An example of a transceiver for use in the UT 400 or 401 is illustrated in FIG. 4. In FIG. 4, at least one antenna 410 is provided for receiving forward link communication signals (e.g., from satellite 300), which are transferred to an analog receiver 414, where they are down-converted, amplified, and digitized. A duplexer element 412 is often used to allow the same antenna to serve both transmit and receive functions. Alternatively, the UT 400 may employ separate antennas for operating at different transmit and receive frequencies.

The digital communication signals output by the analog receiver 414 are transferred to at least one digital data receiver 416A-416N and at least one searcher receiver 418. The digital data receivers to 416A-416N can be used to obtain desired levels of signal diversity, depending on the acceptable level of transceiver complexity, as would be apparent to one skilled in the relevant art.

At least one user terminal control processor 420 is coupled to the digital data receivers 416A-416N and the searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of the digital data receivers 416A-416N are coupled to digital baseband circuitry 422 within the UT 400. The digital baseband circuitry 422 comprises processing and presentation elements used to transfer information to and from UE 500 as shown in FIG. 1, for example. Referring to FIG. 4, if diversity signal processing is employed, the digital baseband circuitry 422 may comprise a diversity combiner and decoder. Some of these elements may also operate under the control of, or in communication with, the control processor 420.

When voice or other data is prepared as an output message or communications signal originating with the UT 400, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a digital transmit power controller 428 which provides output power control to an analog transmit power amplifier 430 for final transmission of the output signal from the antenna 410 to a satellite (e.g., satellite 300).

In FIG. 4, the UT 400 also includes a memory 432 associated with the control processor 420. The memory 432 may include instructions for execution by the control processor 420 as well as data for processing by the control processor 420. In the example illustrated in FIG. 4, the memory 432 may include instructions for performing time or frequency adjustments to be applied to an RF signal to be transmitted by the UT 400 via the return service link to the satellite 300.

In the example illustrated in FIG. 4, the UT 400 also includes an optional local time, frequency and/or position references 434 (e.g., a GPS receiver), which may provide local time, frequency and/or position information to the control processor 420 for various applications, including, for example, time or frequency synchronization for the UT 400.

The digital data receivers 416A-N and the searcher receiver 418 are configured with signal correlation elements to demodulate and track specific signals. The searcher receiver 418 is used to search for pilot signals, or other relatively fixed pattern strong signals, while the digital data receivers 416A-N are used to demodulate other signals associated with detected pilot signals. However, the digital data receivers 416A-N can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These digital data receivers 416A-N also employ frequency tracking elements that can be monitored to provide current frequency and timing information to the control processor 420 for signals being demodulated.

The control processor 420 may use such information to determine to what extent the received signals are offset from the oscillator frequency, when scaled to the same frequency band, as appropriate. This, and other information related to frequency errors and frequency shifts, can be stored in the memory 432 as desired.

The control processor 420 may also be coupled to UE interface circuitry 450 to allow communications between the UT 400 and one or more UEs. The UE interface circuitry 450 may be configured as desired for communication with various UE configurations and accordingly may include various transceivers and related components depending on the various communication technologies employed to communicate with the various UEs supported. For example, the UE interface circuitry 450 may include one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with the UT 400.

Figure 5:
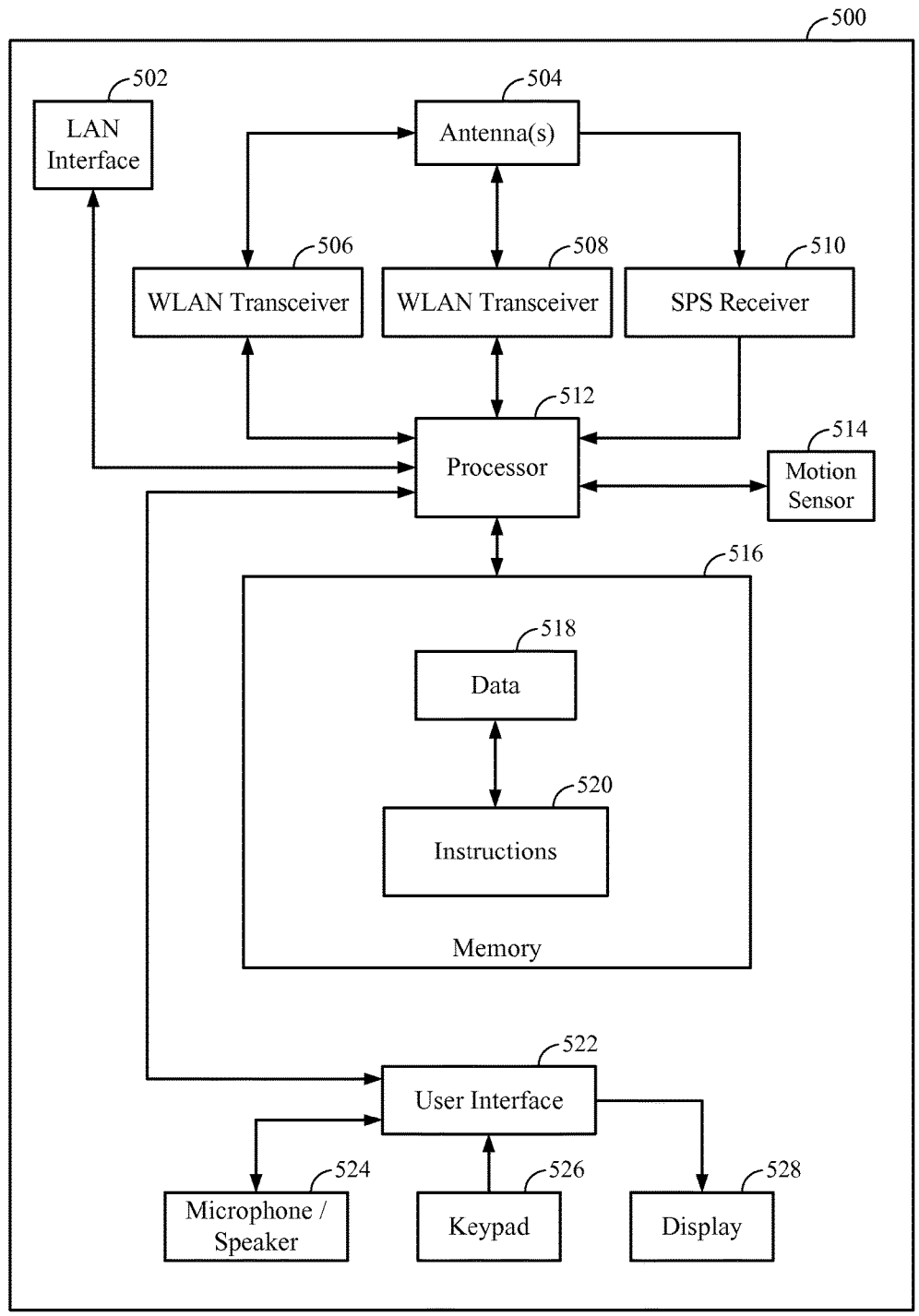
FIG. 5 is a block diagram of one example of the user equipment of FIG. 1.

FIG. 5 is a block diagram illustrating an example of the UE 500, which also can apply to the UE 501 of FIG. 1. The UE 500 as shown in FIG. 5 may be a mobile device, a handheld computer, a tablet, a wearable device, a smart watch, or any type of device capable of interacting with a user, for example. Additionally, the UE 500 may be a network side device that provides connectivity to various ultimate end user devices and/or to various public or private networks. In the example shown in FIG. 5, the UE 500 may comprise a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), the Global Navigation Satellite System (GLONASS) and/or any other global or regional satellite based positioning system. In an alternate aspect, the UE 500 may include the WLAN transceiver 508, such as a Wi-Fi transceiver, with or without the LAN interface 502, the WAN transceiver 506, and/or the SPS receiver 510, for example. Further, the UE 500 may include additional transceivers such as Bluetooth®, ZigBee®, and other known technologies, with or without the LAN interface 502, the WAN transceiver 506, the WLAN transceiver 508 and/or the SPS receiver 510. Accordingly, the elements illustrated for the UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

In the example shown in FIG. 1, two UTs 400 and 401 may conduct two-way communications with the satellite 300 via return and forward service links within a beam coverage. A satellite may communicate with more than two UTs within a beam coverage. The return service link from the UTs 400 and 401 to the satellite 300 is thus a many-to-one channel. Large time delay differentials and frequency offset differentials may exist between different UTs within a beam coverage. Frequency offset differentials may be due to differences in Doppler frequency shifts experienced by the UTs within a beam coverage due to the relative motions of the satellite and the UTs, for example. Some of the UTs may be mobile while others may be stationary, for example. Frequency offset differentials between different UTs may also be cause by other factors, for example, frequency drifts due to radio frequency (RF) components in the transmitter chains of some of the UTs in a beam coverage.

In a satellite communication system such as the example illustrated in FIG. 1, multiple UTs 400 and 401 within a beam coverage may be time-division-multiplexed (TDM'ed), frequency-division-multiplexed (FDM'ed), or both. Large time delay differentials or large frequency offset differentials between the UTs 400 and 401 within a beam coverage would require large guard times or large guard bands to avoid time or frequency interference between the UTs, thereby causing overhead and capacity losses. In order to ensure that return link signals from all UTs 400 and 401 in a beam coverage arrive at the gateway 200 without time delay differentials, or at least without large time delay differentials, time corrections may be applied to the start times of return link transmit signals at the UTs 400 and 401. Likewise, in order to ensure that the return link signals from all UTs 400 and 401 in a beam coverage arrive at the gateway 200 without frequency offset differentials, or at least without large frequency offset differentials, frequency corrections may be applied to the return link transmit signals at the UTs 400 and 401. Time corrections and frequency corrections may be achieved by using open loop pre-correction, closed loop pre-correction, or a combination of both. Examples of open loop pre-correction, closed loop pre-correction and a combination of both are described below with respect to FIGS. 6-10.

Figure 6:
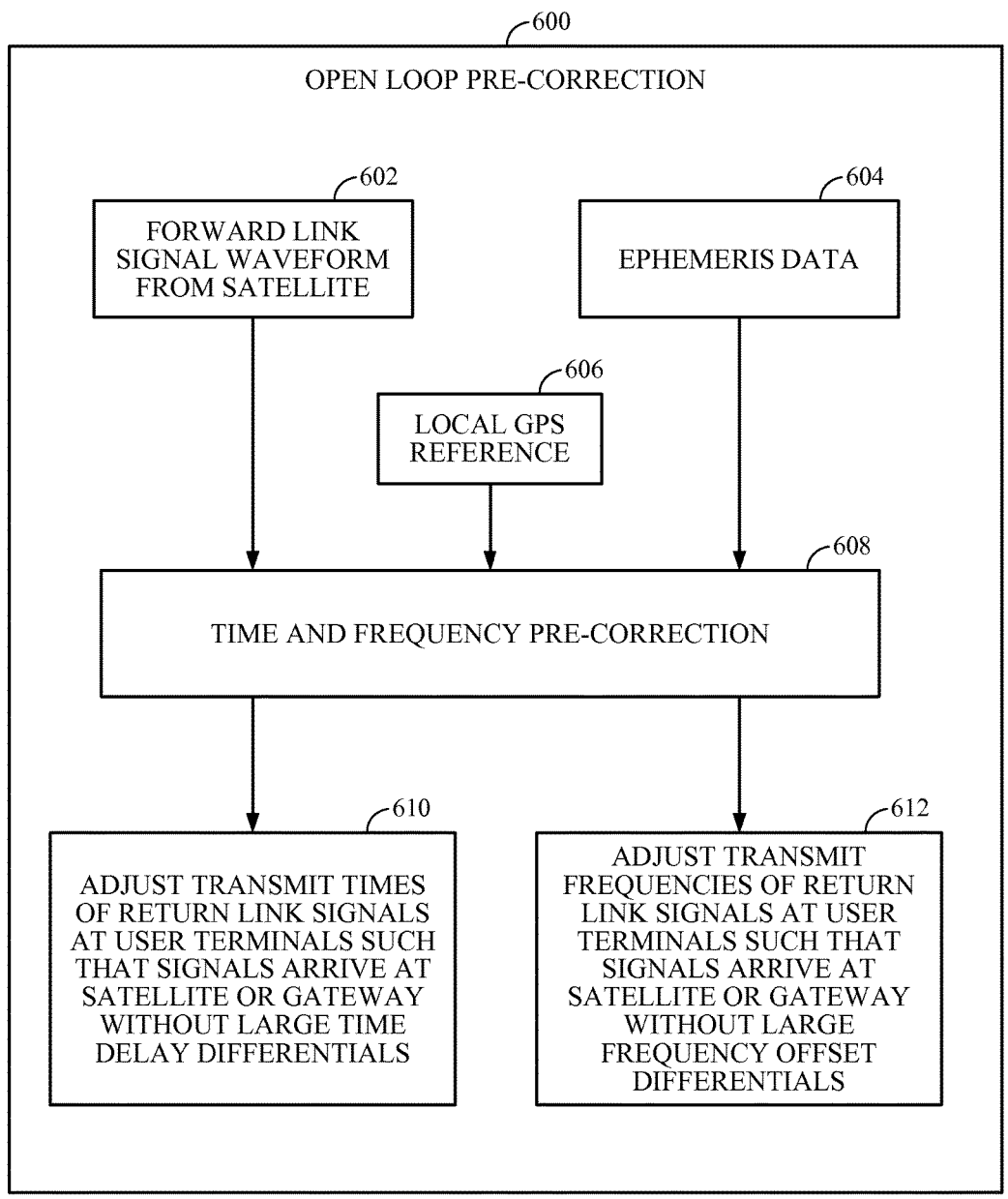
FIG. 6 is a diagram illustrating an example of open loop pre-correction for time or frequency.

FIG. 6 is a diagram illustrating one aspect of an open loop pre-correction for time or frequency corrections. In one aspect, open loop pre-correction may be able to generate sufficiently accurate pre-correction time or frequency values if there are no or relatively small systematic or calibration errors for time or frequency. In a typical non-geosynchronous satellite network, each gateway typically has its own local GPS time or frequency references, and each of the UTs also typically has its own local GPS time or frequency references. It may be assumed that in a typical network, the local GPS time or frequency references at a gateway may be more accurate than the local GPS time or frequency references at a UT.

FIG. 6 illustrates one aspect of open loop pre-correction in one of the UTs in block 600. In one aspect, the UT may compute open-loop pre-correction values for time or frequency for that particular UT in block 608 by using an incoming forward link signal waveform received from the satellite in block 602 and compare the time of arrival and carrier frequency of the incoming forward link signal with a local GPS reference 606, for example. In another aspect, the UT may use ephemeris data in block 604, including but not limited to known positions of the satellite at different instants of time based on the known orbit of the satellite, for example, and the local position of the UT based on the local GPS reference in block 606, for example, to compute open-loop pre-correction values for time or frequency in block 608. In yet another aspect, the UT may use a combination of an incoming forward link signal waveform received from the satellite in block 602 and ephemeris data in block 604 in conjunction with the local GPS reference in block 606 to generate pre-correction values for time or frequency in block 608.

In one aspect, given a common forward link waveform to all UTs within a beam coverage, a comparison between the time of arrival of the forward link waveform and a local time reference, such as a local GPS time reference at a given UT, is a measure of time delay from the satellite to that UT, for example. In another aspect, a comparison of the observed frequency of the forward link waveform relative to a locked frequency reference at a given UT is a measure of frequency offset from the satellite to that UT, for example. The frequency offset obtained by comparing the observed frequency of the forward link waveform to the locked frequency reference at the UT may be largely caused by a Doppler frequency shift due to the relative motion of the satellite with respect to the UT, although other factors may also contribute to the frequency offset.

In one aspect, the time delay obtained by comparing the time of arrival of the forward link waveform and the local time reference at each of the UTs may be used to pre-compensate for the time of transmission of the return link signal by each of the UTs, such that the return link signals from all of the UTs in a beam coverage will arrive at the satellite receive antenna for the return links with no time delay differential, or with small time delay differentials within a tolerance. Similarly, the frequency offset obtained by comparing the frequency of the forward link waveform with a locked frequency reference at each of the UTs may be used to pre-compensate for the transmit frequency of the return link signal by each of the UTs, such that the return link signals from all of the UTs in a beam coverage will arrive at the satellite receive antenna with no frequency offset differential, or with small frequency offset differentials within a tolerance.

In one aspect, a major component of time delay or frequency offset differentials across the UTs is due to the different time delays and different Doppler frequency shifts experienced by different UTs across a beam coverage. In one aspect, if each UT can estimate the absolute time delay and Doppler shift it observes on a received forward link waveform and uses the estimated absolute time delay and Doppler shift for the pre-correction of uplink transmit time and frequency, the time delay and frequency offset differentials between different UTs within a beam coverage may be reduced to zero or nearly zero. As described above, in one aspect, the observed time of arrival may be compared to an accurate local time reference, such as a local GPS time reference, to derive the amount of absolute time delay in the arrival of the forward link waveform at each of the UTs. Likewise, the observed frequency of the forward link waveform may be compared to an accurate locked frequency reference at each of the UTs to derive the amount of absolute frequency shift at each of the UTs.

The pre-correction time offset value for pre-compensating the time of transmission of the return link signal by each of the UTs may be based on a comparison of the observed time of arrival of the forward link signal and the local time reference, and similarly, the pre-correction frequency offset value for pre-compensating the transmit frequency of the return link signal by each of the UTs may be based on a comparison of the observed frequency of the forward link signal and the locked frequency reference at the UT. In one aspect, the time or frequency correction values may be refined by using ephemeris of the satellite. For example, the position or velocity of the satellite at a given time based on a known orbit may be used as bases for estimating the time of arrival or Doppler shift of the forward link signal at a UT. In another aspect, one or more of the UTs in a beam coverage may be mobile. Local GPS data for a mobile UT, such as the position or velocity of the UT, may also be used as bases in conjunction with ephemeris for estimating the time of arrival or Doppler shift.

In one aspect, the pre-correction time or frequency values may be applied to pre-compensate for transmit times or frequencies of return link signals at the UTs, such that the time delay or frequency offset differentials of return link signals received at the gateway are eliminated or at least reduced. In another aspect, the pre-correction time or frequency values are applied to pre-compensate for transmit times or frequencies of return link signals at the UTs in a beam coverage of the satellite, such that the time delay or frequency offset differentials at the receive antenna of the satellite, the point at which the return link signals from various UTs are combined, are eliminated or at least reduced. If the times or arrival or carrier frequencies of received return link signals from all of the UTs in a beam coverage are aligned at that the satellite receive antenna, then the times of arrival and carrier frequencies will also be aligned at the receive antenna of the gateway if the satellite is simply a repeater satellite. In another aspect, if return service link signals received from the UTs are demodulated or processed by the satellite, then the pre-correction time or frequency values applied at each of the UTs in a beam coverage would achieve time or frequency alignment at the receive antenna of the satellite instead of the gateway.

After the pre-correction values for the time or frequency are obtained by open loop pre-correction in block 608, the pre-correction values may be applied for time or frequency corrections in blocks 610 and 612, respectively. In one aspect, the transmit start time of a return link signal at each of the UTs may be adjusted such that all the return link signals transmitted by all the UTs within a beam coverage arrive at the satellite or the gateway without large time delay differentials between them in block 610. In each UT, the transmit start time of a return link signal may be adjusted in block 610 by advancing or retarding the start time of that return link signal by the amount of the time pre-correction value computed in block 608, for example. The time pre-correction value may be positive or negative for each of the UTs within a beam coverage.

As also shown in FIG. 6, after the frequency pre-correction values are obtained by the open loop pre-correction in block 608, the pre-correction frequency value obtained in block 608 may be used adjust the carrier frequency of the return link transmit signal at each of the UTs such that all the return link signals transmitted by all the UTs within a beam coverage arrive at the satellite or the gateway without large frequency offset differentials between them in block 612. In each UT, the carrier frequency of a return link signal may be adjusted in block 612 by increasing or decreasing the carrier frequency of that return link signal by the amount of the frequency pre-correction value computed in block 608, for example. The frequency pre-correction value may be positive or negative for each of the UTs within a beam coverage. For example, differences in frequency offsets between the UTs may be due to differences in Doppler frequency shifts between different UTs within a beam coverage, or due to other factors such as frequency drifts in the transmitters, or some combination of Doppler shifts and other factors.

Figure 7:
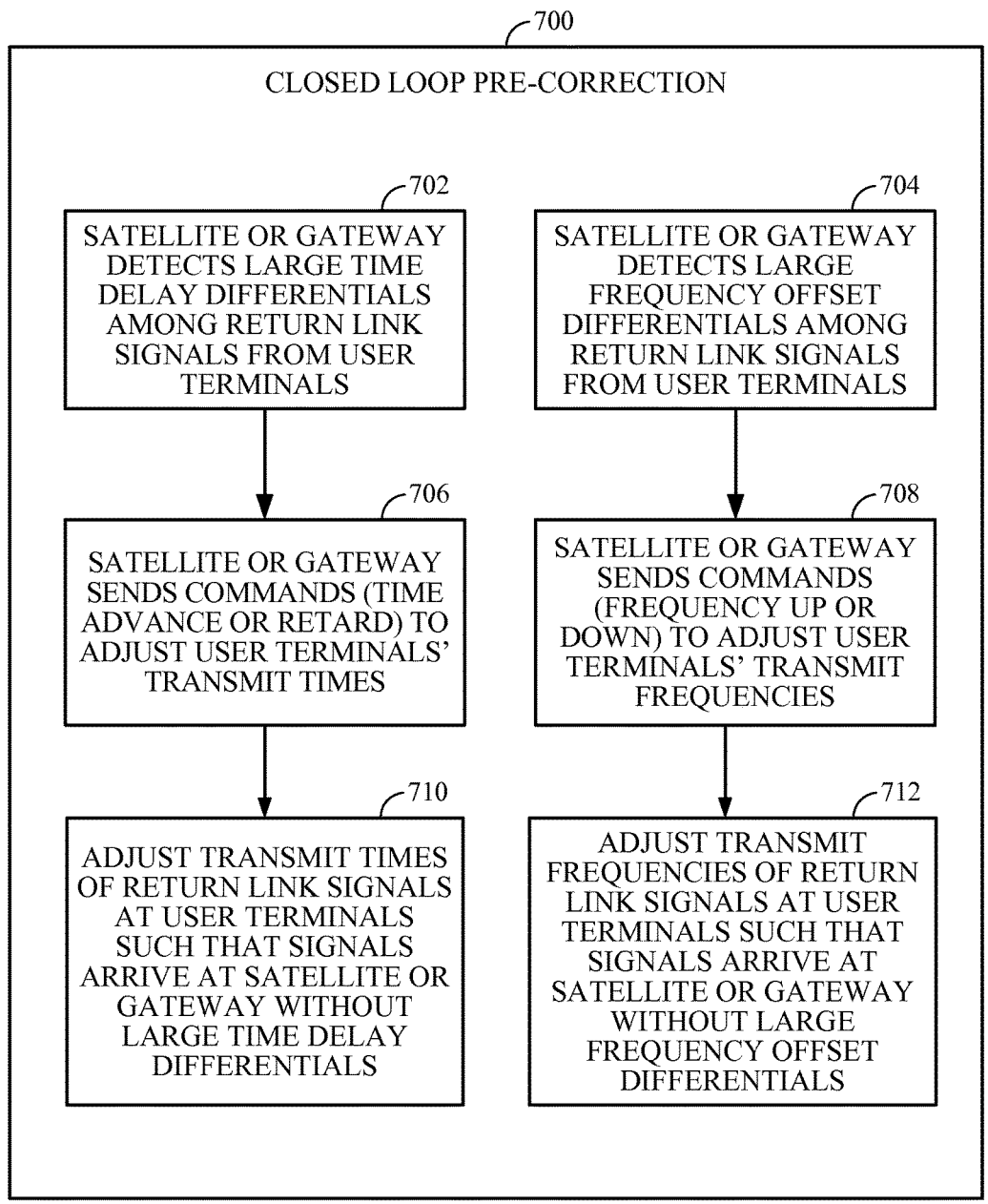
FIG. 7 is a diagram illustrating an example of closed loop pre-correction for time or frequency.

FIG. 7 is a diagram illustrating one aspect of closed loop pre-correction for time or frequency in block 700. In one aspect, closed loop pre-correction of time is initiated when the satellite or the gateway detects large time delay differentials among return link signals received from the UTs within a beam coverage in block 702. In another aspect, closed loop pre-correction of frequency is initiated when the satellite or the gateway detects large frequency offset differentials among return link signals received from the UTs in a beam coverage in block 704. The satellite or the gateway may experience large differentials in time delays and large differentials in frequency offsets from various UTs in a beam coverage in blocks 702 and 704, and may in response initiate closed loop pre-correction for both time and frequency.

In response to detecting that large time delay differentials exist among the return link signals from the UTs in a beam coverage in block 702, the satellite or the gateway sends time advance or retard commands to the UTs to adjust the transmit start times of return link signals in block 706. The satellite or the gateway may send a separate time advance or retard command particular to each of the UTs. Some of the UTs may receive commands to advance their transmit start times while others may receive commands to retard their transmit start time. The amount of time advancement or retardation may be different for each of the UTs in a beam coverage. When each of the UTs receives a time advance or retard command from the satellite or the gateway, it adjusts the transmit time of return link signal at that UT in block 710, such that all reverse link signals received from all UTs arrive at the satellite or the gateway without large time delay differentials. If the satellite is simply a repeater satellite between the gateway and the UTs, then the gateway may send time advance or retard commands to the UTs in a beam coverage. On the other hand, if the satellite processes data payloads, then the satellite may send time advance or retard commands to the UTs.

For frequency correction, in response to detecting that large frequency offset differentials exist among the return link signals from the UTs in a beam coverage in block 704, the satellite or the gateway sends frequency up or down commands to the UTs to adjust the carrier frequencies of return link signals in block 708. The satellite or the gateway may send a separate frequency up or down command particular to each of the UTs. Some of the UTs may receive commands to increase their return link carrier frequencies while others may receive commands to decrease their return link carrier frequencies. The amount of frequency increase or decrease may be different for each of the UTs in a beam coverage. When each of the UTs receives a frequency up or down command from the satellite or the gateway, it adjusts the carrier frequency of the return link signal at that UT in block 712, such that all reverse link signals received from all UTs arrive at the satellite or the gateway without large frequency offset differentials. Again, if the satellite is simply a repeater satellite, then the gateway may send frequency up or down commands to the UTs in a beam coverage. On the other hand, if the satellite processes data payloads, then the satellite may send frequency up or down commands to the UTs.

Figure 8:
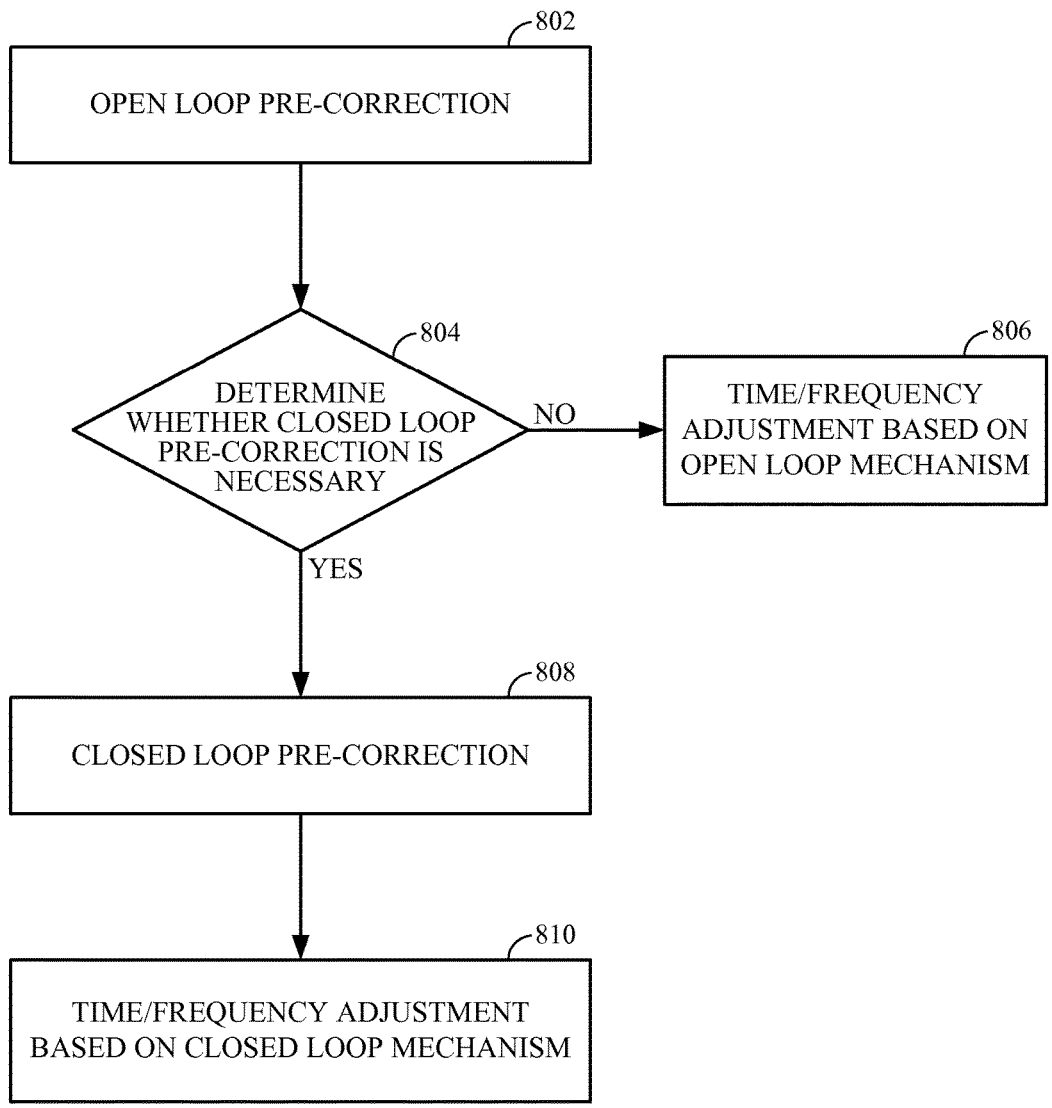
FIG. 8 is a diagram illustrating an example of open loop pre-correction in combination with closed loop pre-correction for time or frequency.

FIG. 8 is a diagram illustrating an example of time or frequency pre-correction which includes open loop pre-correction and closed loop pre-correction. In one aspect, open loop pre-correction is performed at each of the UTs in a beam coverage to compute pre-correction values for time or frequency in block 802. After open loop pre-correction is performed in block 802, a determination is made as to whether closed loop pre-correction is necessary in addition to the open loop pre-correction to obtain more accurate pre-correction time or frequency values, as illustrated in block 804. The determination of whether a closed loop pre-correction is necessary in addition to the open loop pre-correction may be made in various manners based on various factors. For example, if the gateway detects that large time delay differentials exist between the return link signals received from the UTs in a beam coverage, then it may determine that closed loop pre-correction of time would be necessary. Likewise, if the gateway detects that large frequency offset differentials exist between the return link signals received from the UTs in a beam coverage, then it may determine that closed loop pre-correction of frequency would be necessary.

If it is determined that closed loop pre-correction is not necessary to produce more accurate pre-correction time or frequency values in block 804, then time or frequency adjustments based on the pre-correction time or frequency values computed by the open loop pre-correction in block 802 may be performed by the UTs in block 806 without resorting to closed loop pre-correction. Examples of open loop pre-correction of time or frequency are described above with respect to FIG. 6. On the other hand, if it is determined that closed loop pre-correction is necessary to obtain more accurate pre-correction time or frequency values in block 804, then closed loop pre-correction is performed to produce more accurate pre-correction time or frequency values in block 808, such that the return link signals received by the gateway from various UTs in a beam coverage do not exhibit large time delay differentials or large frequency offset differentials. Examples of closed loop pre-correction of time or frequency are described above with respect to FIG. 7. For example, the gateway may send time advance or retard commands to the UTs to adjust their transmit start times of return link signals, or frequency up or down commands to the UTs to adjust their carrier frequencies of return link signals. Upon receiving the time advance or retard commands or frequency up or down commands from the gateway, each UT in the beam coverage may adjust its transmit start time or carrier frequency in block 810, for example.

Figure 9:
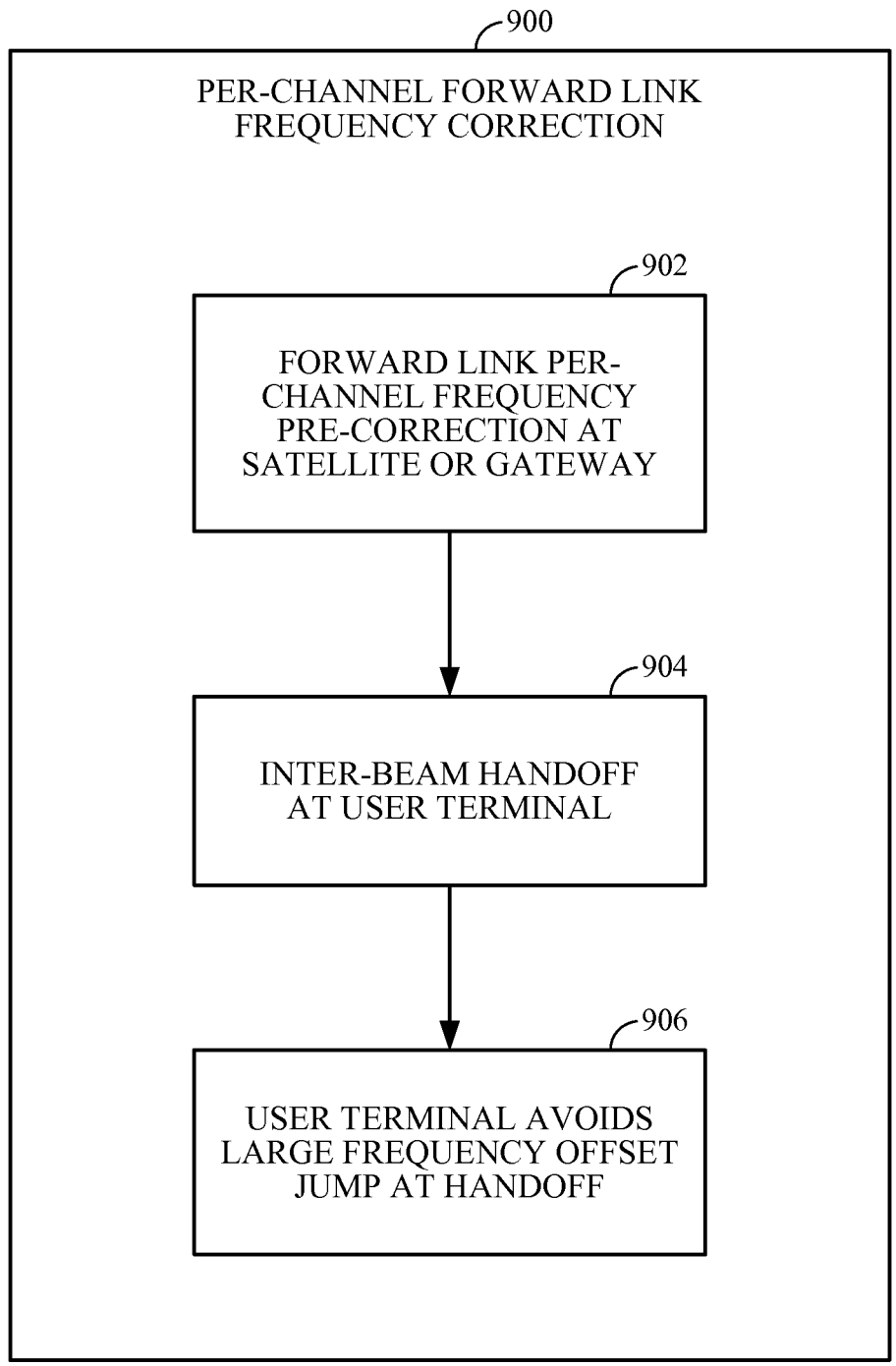
FIG. 9 is a diagram illustrating an example of per-channel forward link frequency correction to avoid a large jump in frequency offset at the User Terminal at handoff.

FIG. 9 is a diagram illustrating an example of per-channel forward link frequency correction to avoid a large jump in frequency offset when a UT undergoes an inter-beam handoff in block 900. If per-channel frequency pre-correction is not performed by the gateway for forward feeder link signals, there may be a large residual frequency offset due to a Doppler differential across the entire RF bandwidth. Because each beam uses a feeder link channel, residual frequency offsets in the feeder link may carry over to the beam. If frequency pre-correction is not performed for each channel on the forward feeder link at the gateway, then a large frequency offset jump may be experienced by the UT during an inter-beam handoff.

Per-channel frequency correction may be performed for forward link transmit signals at the satellite or the gateway in block 902. In one aspect, the satellite or the gateway may adjust the carrier frequency of each channel of forward feeder link signals upward or downward such that when the UT undergoes an inter-beam handoff, it will not experience a large frequency offset jump during the handoff. As illustrated in FIG. 9, an inter-beam handoff at UT occurs in block 904, and the UT avoids experiencing a large jump in frequency offset in the forward link at handoff in block 906, because the satellite or the gateway has performed per-channel forward link frequency pre-correction in block 902. If the satellite is simply a repeater satellite, then the gateway may be in charge of per-channel frequency correction such that the UT will avoid experiencing a large frequency offset jump during an inter-beam handoff. On the other hand, if the satellite processes data payloads, then the satellite may be in charge of per-channel frequency correction to avoid a large frequency offset jump during an inter-beam handoff at the UT.

Figure 10:
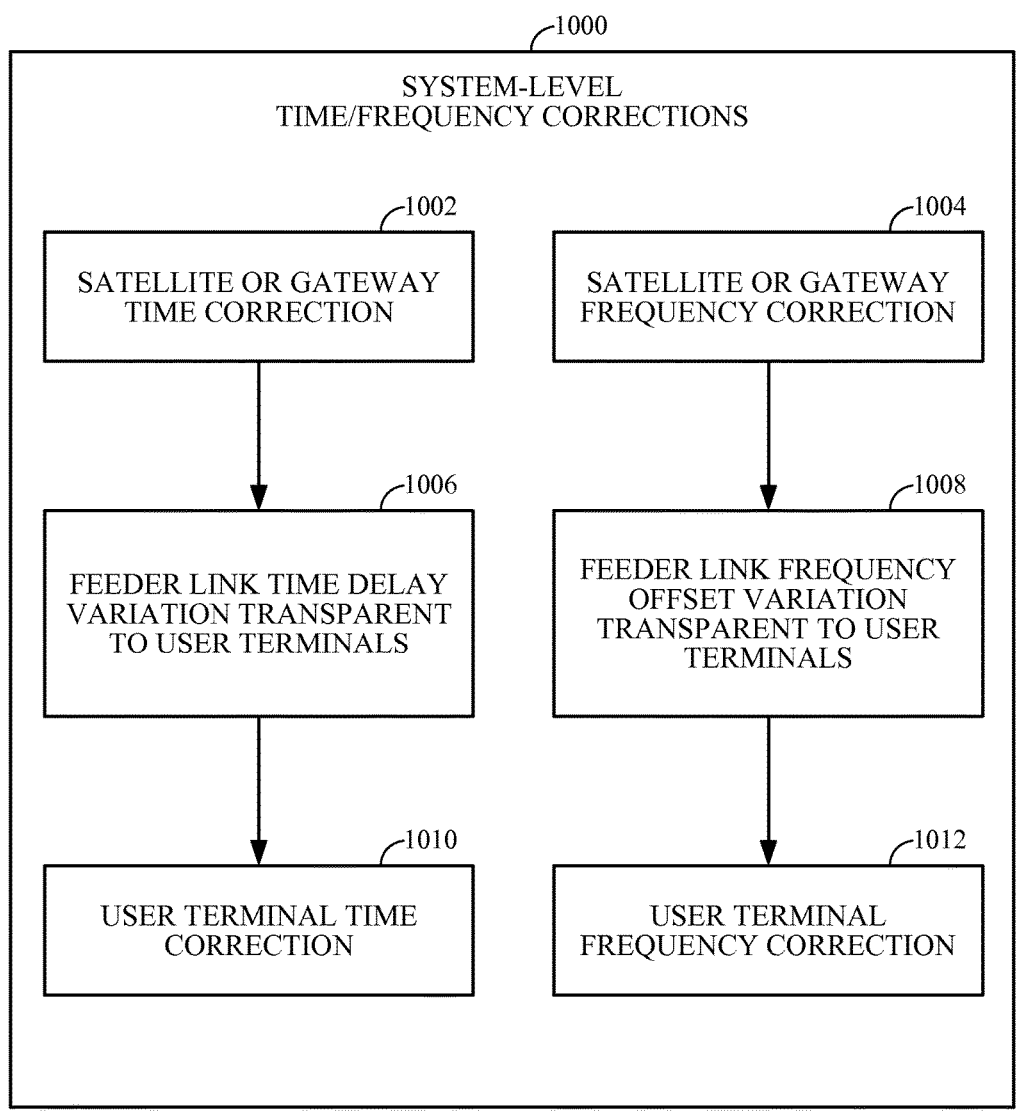
FIG. 10 is a diagram illustrating an example of system-level time or frequency corrections involving the gateway and the User Terminals.

FIG. 10 is a diagram illustrating an example of system-level time or frequency corrections involving the satellite or the gateway and the UTs in block 1000. In various aspects, time or frequency corrections at the satellite or the gateway may play an important role in conjunction with time or frequency corrections at the UTs at the system level. In FIG. 10, time correction is performed at the satellite or the gateway in block 1002, and frequency correction is performed at the satellite or the gateway in block 1004. In one aspect, time correction for feeder link signals at the satellite or the gateway in block 1002 may make feeder link time delay variations, if any, transparent to the UTs in block 1006. Likewise, frequency correction for feeder link signals at the satellite or the gateway in block 1004 may make feeder link frequency offset variations, if any, due to Doppler variations or other factors, transparent to the UTs in block 1008. Working together at the system level by taking into account the feeder link time delay variations or frequency offset variations, each of the UTs may perform time correction in block 1010 or frequency correction in block 1012, by using open loop pre-correction, closed loop pre-correction, or a combination of both, examples of which are illustrated in FIGS. 6-8 and described above, to adjust the transmit start time or carrier frequency of the return link signal at each of the UTs, for example.

Figure 11:
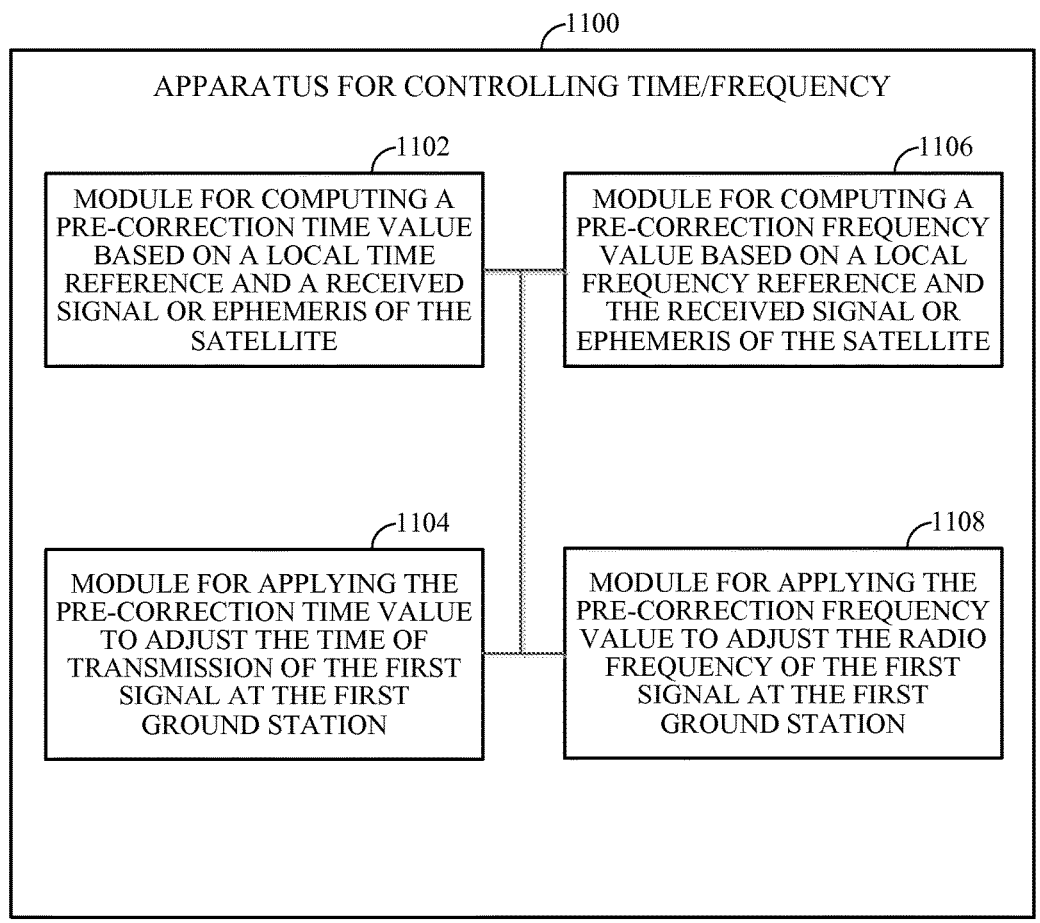
FIG. 11 illustrates an example of an apparatus for controlling the time and frequency of a signal at a ground station in communication with a satellite, represented as a series of interrelated functional modules.

FIG. 11 illustrates an example of an apparatus 1100 for controlling the time and frequency of a signal at a ground station in communication with a satellite, represented as a series of interrelated functional modules. A module 1102 for computing a pre-correction time value based on a local time reference and a received signal or ephemeris of the satellite may correspond, at least in some aspects to, for example, a communication controller or processor, or a component thereof as discussed herein (e.g., the control processor 420 or the like). A module 1104 for applying the pre-correction time value to adjust the time of transmission of the first signal at the first ground station may correspond, at least in some aspects to, for example, a communication controller or processor, or a component thereof as discussed herein (e.g., the control processor 420 or the like). A module 1106 for computing a pre-correction frequency value based on a local frequency reference and the received signal or ephemeris of the satellite may correspond, at least in some aspects to, for example, a communication controller or processor, or a component thereof as discussed herein (e.g., the control processor 420 or the like). A module 1108 for applying the pre-correction frequency value to adjust the radio frequency of the first signal at the first ground station may correspond, at least in some aspects to, for example, a communication controller or processor, or a component thereof as discussed herein (e.g., the control processor 420 or the like).

The functionality of the modules of FIG. 11 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 11, as well as other components and functions described herein, may be implemented using any suitable means. Such means also may be implemented, at least in part, using corresponding structure as taught herein. For example, the components described above in conjunction with the "module for" components of FIG. 11 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

Accordingly, one aspect of the disclosure can include a computer readable media embodying a method for time or frequency synchronization in non-geosynchronous satellite communication systems. Accordingly, the disclosure is not limited to illustrated examples and any means for performing the functionality described herein are included in aspects of the disclosure.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of controlling a time of transmission and radio frequency of a first signal at a first ground station that includes a first user terminal (UT) in communication with a non-geosynchronous satellite, the non-geosynchronous satellite further being in communication with a gateway, the method comprising:
    computing a pre-correction time value based on a local time reference and a received signal or ephemeris of the non-geosynchronous satellite;
    applying the pre-correction time value to adjust the time of transmission of the first signal at the first ground station;
    computing a pre-correction frequency value based on a local frequency reference and the received signal or ephemeris of the non-geosynchronous satellite;
    applying the pre-correction frequency value to adjust the radio frequency of the first signal at the first ground station; and
    transmitting the first signal to the non-geosynchronous satellite in accordance with the time of transmission that is adjusted based on the pre-correction time value and the radio frequency that is adjusted based on the pre-correction frequency value,
    wherein the pre-correction time value is configured to reduce a time-of-arrival (TOA) differential between a TOA of the first signal at the non-geosynchronous satellite and/or the gateway and one or more TOAs of one or more other signals from one or more other UTs at the non-geosynchronous satellite and/or the gateway,
    wherein the pre-correction frequency value is configured to reduce a frequency offset differential between a radio frequency of the first signal at the non-geosynchronous satellite and/or the gateway and one or more radio frequencies of the one or more other signals from the one or more other UTs at the non-geosynchronous satellite and/or the gateway, or any combination thereof.

2. The method of claim 1, wherein the non-geosynchronous satellite is operable to communicate with at least a second UT among the one or more other UTs, and wherein the second UT is operable to transmit a second signal to the non-geosynchronous satellite.

3. The method of claim 2, wherein the gateway is operable to receive the first signal from the first UT and the second signal from the second UT through the non-geosynchronous satellite.

4. The method of claim 3, wherein the time of transmission of the first signal at the first UT is adjusted to reduce the TOA differential between TOAs of the first signal and the second signal at the gateway, and wherein the radio frequency of the first signal at the first UT is adjusted to reduce a difference between Doppler shifts of the first signal and the second signal at the gateway.

5. The method of claim 3, wherein a time of transmission of the second signal at the second UT is adjusted to reduce the TOA differential between TOAs of the first signal and the second signal at the gateway, and wherein a radio frequency of the second signal at the second UT is adjusted to reduce a difference between Doppler shifts of the first signal and the second signal at the gateway.

6. The method of claim 3, further comprising:
    receiving, from the gateway, at least one command to advance or retard the time of transmission of the first signal at the first UT to reduce the TOA differential between TOAs of the first signal and the second signal at the gateway, and
    receiving, from the gateway, at least one additional command to increase or decrease the radio frequency of the first signal at the first UT to reduce a difference between Doppler shifts of the first signal and the second signal at the gateway.

7. The method of claim 2, wherein the time of transmission of the first signal at the first UT is adjusted to reduce the TOA differential between TOAs of the first signal and the second signal at the non-geosynchronous satellite, and wherein a radio frequency of the second signal at the second UT is adjusted to reduce a difference between Doppler shifts of the first signal and the second signal at the non-geosynchronous satellite.

8. The method of claim 2, wherein a time of transmission of the second signal at the second UT is adjusted to reduce the TOA differential between TOAs of the first signal and the second signal at the non-geosynchronous satellite, and wherein a radio frequency of the second signal at the first UT is adjusted to reduce a difference between Doppler shifts of the first signal and the second signal at the non-geosynchronous satellite.

9. The method of claim 2, further comprising:
receiving, from the satellite, at least one command to advance or retard the time of transmission of the first signal at the first UT to reduce the TOA differential between TOAs of the first signal and the second signal at the non-geosynchronous satellite, and
receiving, from the satellite, at least one additional command to increase or decrease the radio frequency of the first signal at the first UT to reduce a difference between Doppler shifts of the first signal and the second signal at the non-geosynchronous satellite.

10. The method of claim 1, wherein the local time reference comprises a local global positioning system (GPS) time reference.

11. An apparatus configured to control a time of transmission and radio frequency of a first signal at a first ground station that includes a first user terminal (UT) in communication with a non-geosynchronous satellite, the non-geosynchronous satellite further being in communication with a gateway, the apparatus comprising:
at least one processor coupled to at least one transceiver and configured to:
compute a pre-correction time value based on a local time reference and a received signal or ephemeris of the non-geosynchronous satellite;
apply the pre-correction time value to adjust the time of transmission of the first signal at the first ground station;
compute a pre-correction frequency value based on a local frequency reference and the received signal or ephemeris of the non-geosynchronous satellite;
apply the pre-correction frequency value to adjust the radio frequency of the first signal at the first ground station; and
transmit the first signal to the non-geosynchronous satellite in accordance with the time of transmission that is adjusted based on the pre-correction time value and the radio frequency that is adjusted based on the pre-correction frequency value,
wherein the pre-correction time value is configured to reduce a time-of-arrival (TOA) differential between a TOA of the first signal at the non-geosynchronous satellite and/or the gateway and one or more TOAs of one or more other signals from one or more other UTs at the non-geosynchronous satellite and/or the gateway,
wherein the pre-correction frequency value is configured to reduce a frequency offset differential between a radio frequency of the first signal at the non-geosynchronous satellite and/or the gateway and one or more radio frequencies of the one or more other signals from the one or more other UTs at the non-geosynchronous satellite and/or the gateway, or any combination thereof.

12. The apparatus of claim 11, wherein the non-geosynchronous satellite is operable to communicate with at least a second UT among the one or more other UTs, and wherein the second UT is operable to transmit a second signal to the non-geosynchronous satellite.

13. The apparatus of claim 12, wherein the gateway is operable to receive the first signal from the first UT and the second signal from the second UT through the non-geosynchronous satellite.

14. The apparatus of claim 13, wherein the time of transmission of the first signal at the first UT is adjusted to reduce the TOA differential between TOAs of the first signal and the second signal at the gateway, and wherein the radio frequency of the first signal at the first UT is adjusted to reduce a difference between Doppler shifts of the first signal and the second signal at the gateway.

15. The apparatus of claim 13, wherein a time of transmission of the second signal at the second UT is adjusted to reduce the TOA differential between TOAs of the first signal and the second signal at the gateway, and wherein a radio frequency of the second signal at the second UT is adjusted to reduce a difference between Doppler shifts of the first signal and the second signal at the gateway.

16. The apparatus of claim 13, wherein the at least one processor is further configured to:
receive, from the gateway, at least one command to advance or retard the time of transmission of the first signal at the first UT to reduce the TOA differential between TOAs of the first signal and the second signal at the gateway, and
receive, from the gateway, at least one additional command to increase or decrease the radio frequency of the first signal at the first UT to reduce a difference between Doppler shifts of the first signal and the second signal at the gateway.

17. The apparatus of claim 12, wherein the time of transmission of the first signal at the first UT is adjusted to reduce the TOA differential between TOAs of the first signal and the second signal at the non-geosynchronous satellite, and wherein a radio frequency of the second signal at the second UT is adjusted to reduce a difference between Doppler shifts of the first signal and the second signal at the non-geosynchronous satellite.

18. The apparatus of claim 12, wherein a time of transmission of the second signal at the second UT is adjusted to reduce the TOA differential between TOAs of the first signal and the second signal at the non-geosynchronous satellite, and wherein a radio frequency of the second signal at the first UT is adjusted to reduce a difference between Doppler shifts of the first signal and the second signal at the non-geosynchronous satellite.

19. The apparatus of claim 12, wherein the at least one processor is further configured to:
receive, from the satellite, at least one command to advance or retard the time of transmission of the first signal at the first UT to reduce the TOA differential between TOAs of the first signal and the second signal at the non-geosynchronous satellite, and
receive, from the satellite, at least one additional command to increase or decrease the radio frequency of the first signal at the first UT to reduce a difference between Doppler shifts of the first signal and the second signal at the non-geosynchronous satellite.

20. An apparatus for controlling a time of transmission and radio frequency of a first signal at a first ground station that includes a first user terminal (UT) in communication with a non-geosynchronous satellite, the non-geosynchronous satellite further being in communication with a gateway, the apparatus comprising:
means for computing a pre-correction time value based on a local time reference and a received signal or ephemeris of the non-geosynchronous satellite;
means for applying the pre-correction time value to adjust the time of transmission of the first signal at the first ground station;
means for computing a pre-correction frequency value based on a local frequency reference and the received signal or ephemeris of the non-geosynchronous satellite;
means for applying the pre-correction frequency value to adjust the radio frequency of the first signal at the first ground station; and
means for transmitting the first signal to the non-geosynchronous satellite in accordance with the time of transmission that is adjusted based on the pre-correction time value and the radio frequency that is adjusted based on the pre-correction frequency value,
wherein the pre-correction time value is configured to reduce a time-of-arrival (TOA) differential between a TOA of the first signal at the non-geosynchronous satellite and/or the gateway and one or more TOAs of one or more other signals from one or more other UTs at the non-geosynchronous satellite and/or the gateway,
wherein the pre-correction frequency value is configured to reduce a frequency offset differential between a radio frequency of the first signal at the non-geosynchronous satellite and/or the gateway and one or more radio frequencies of the one or more other signals from the one or more other UTs at the non-geosynchronous satellite and/or the gateway, or any combination thereof.

21. The apparatus of claim 20, wherein the non-geosynchronous satellite is operable to communicate with at least a second UT among the one or more other UTs, and wherein the second UT is operable to transmit a second signal to the non-geosynchronous satellite.

22. The apparatus of claim 21, wherein the gateway is operable to receive the first signal from the first UT and the second signal from the second UT through the non-geosynchronous satellite.

23. The apparatus of claim 22, wherein the time of transmission of the first signal at the first UT is adjusted to reduce the TOA differential between TOAs of the first signal and the second signal at the gateway, and wherein the radio frequency of the first signal at the first UT is adjusted to reduce a difference between Doppler shifts of the first signal and the second signal at the gateway.

24. The apparatus of claim 21, wherein the time of transmission of the first signal at the first UT is adjusted to reduce the TOA differential between TOAs of the first signal and the second signal at the non-geosynchronous satellite, and wherein a radio frequency of the second signal at the second UT is adjusted to reduce a difference between Doppler shifts of the first signal and the second signal at the non-geosynchronous satellite.

25. A non-transitory computer-readable medium comprising instructions to cause a computer or processor to control a time of transmission and radio frequency of a first signal at a first ground station that includes a first user terminal (UT) in communication with a non-geosynchronous satellite, the non-geosynchronous satellite further being in communication with a gateway, the instructions comprising instructions to:
compute a pre-correction time value based on a local time reference and a received signal or ephemeris of the non-geosynchronous satellite;
apply the pre-correction time value to adjust the time of transmission of the first signal at the first ground station;
compute a pre-correction frequency value based on a local frequency reference and the received signal or ephemeris of the non-geosynchronous satellite;
apply the pre-correction frequency value to adjust the radio frequency of the first signal at the first ground station; and
transmit the first signal to the non-geosynchronous satellite in accordance with the time of transmission that is adjusted based on the pre-correction time value and the radio frequency that is adjusted based on the pre-correction frequency value,
wherein the pre-correction time value is configured to reduce a time-of-arrival (TOA) differential between a TOA of the first signal at the non-geosynchronous satellite and/or the gateway and one or more TOAs of one or more other signals from one or more other UTs at the non-geosynchronous satellite and/or the gateway,
wherein the pre-correction frequency value is configured to reduce a frequency offset differential between a radio frequency of the first signal at the non-geosynchronous satellite and/or the gateway and one or more radio frequencies of the one or more other signals from the one or more other UTs at the non-geosynchronous satellite and/or the gateway, or any combination thereof.

26. The non-transitory computer-readable medium of claim 25, wherein the non-geosynchronous satellite is operable to communicate with at least a second UT among the one or more other UTs, and wherein the second UT is operable to transmit a second signal to the non-geosynchronous satellite.

27. The non-transitory computer-readable medium of claim 26, wherein the gateway is operable to receive the first signal from the first UT and the second signal from the second UT through the non-geosynchronous satellite.

28. The non-transitory computer-readable medium of claim 27, wherein the time of transmission of the first signal at the first UT is adjusted to reduce the TOA differential between TOAs of the first signal and the second signal at the gateway, and wherein the radio frequency of the first signal at the first UT is adjusted to reduce a difference between Doppler shifts of the first signal and the second signal at the gateway.

29. The non-transitory computer-readable medium of claim 26, wherein the time of transmission of the first signal at the first UT is adjusted to reduce the TOA differential between TOAs of the first signal and the second signal at the non-geosynchronous satellite, and wherein a radio frequency of the second signal at the second UT is adjusted to reduce a difference between Doppler shifts of the first signal and the second signal at the non-geosynchronous satellite.

* * * * *